United States Patent [19]

Trahan et al.

[11] Patent Number: 4,889,549
[45] Date of Patent: Dec. 26, 1989

[54] PLUNGER OPERATING MECHANISM FOR A GLASS FORMING MACHINE

[75] Inventors: Albert J. Trahan, Vernon; Robert J. Douglas, North Granby, both of Conn.

[73] Assignee: Emhart Industries, Inc., Farmington, Conn.

[21] Appl. No.: 337,510

[22] Filed: Apr. 13, 1989

[51] Int. Cl.⁴ ............................................. C03B 11/06
[52] U.S. Cl. ......................................... 65/314; 65/318
[58] Field of Search ................. 65/305, 314, 318, 362; 92/61, 107, 108; 425/419

[56] References Cited

U.S. PATENT DOCUMENTS 3,573,025 3/1971 Hamilton .............................. 65/318
4,274,859 6/1981 Mumford .............................. 65/314

Primary Examiner—Joye L. Woodard
Attorney, Agent, or Firm—Spencer T. Smith

[57] ABSTRACT

An individual section of a glass forming machine has a cylinder for controlling the displacement of the plunger. The piston is tandem in nature so that pressure can be selectively reduced for the final portion of plunger advance and the inner diameter of the cylinder guides plunger advancement at all pressures.

2 Claims, 2 Drawing Sheets

PLUNGER OPERATING MECHANISM FOR A GLASS FORMING MACHINE

BACKGROUND OF THE INVENTION

In an individual section glass container forming machine, a gob of molten glass is dropped into a blank mold and formed by a plunger into a parison. Such plungers have a long stroke, most of which is from a fully retracted or down position, to a partially up position where the top of the plunger will support the gob when it is dropped into the blank mold. Parison formation results from the continued upward displacement of the plunger to its fully up position.

U.S. Pat. No. 4,274,859 discloses tandem concentric pistons for controlling the displacement of the plunger. Both pistons are displaced conjointly for rapid displacement and the inner piston, which is connected to the plunger, moves separately when slow displacement is to occur. As a result, different cylindrical surfaces guide the plunger during rapid and slow displacement and this is undesirable.

SUMMARY OF THE INVENTION

It is accordingly an object of the present invention to provide a tandem piston for enabling selected rapid and slow displacement of the plunger with plunger guidance always being controlled by the same cylindrical surface.

Other objects and advantages of the present invention will become apparent from the following portion of the specification and from the following drawing which illustrates in accordance with the mandate of the patent statutes a presently preferred embodiment incorporating the principles of the invention.

DETAILED DESCRIPTION OF THE DRAWINGS

Figure 1:
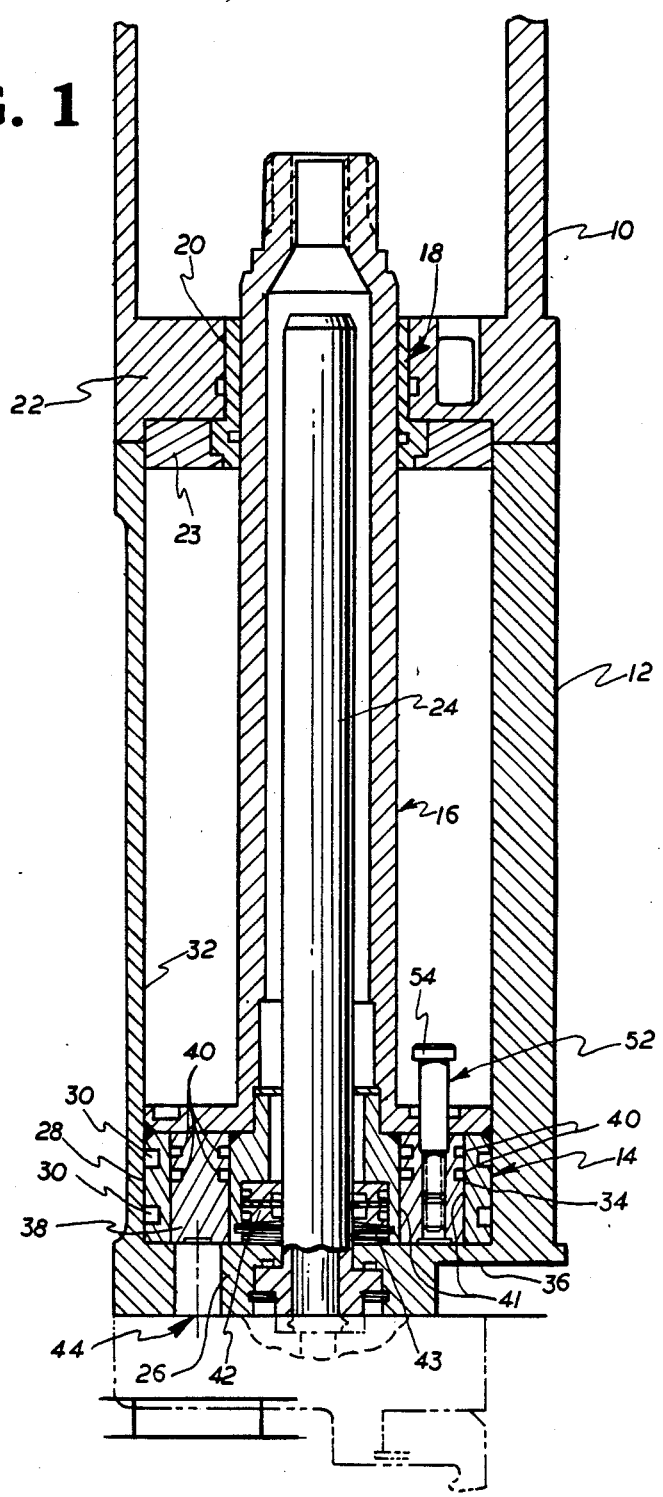
FIG. 1 is a vertical cross-sectional view of the lower portion of a parison formation station of an individual section glass forming apparatus.
Figure 2:
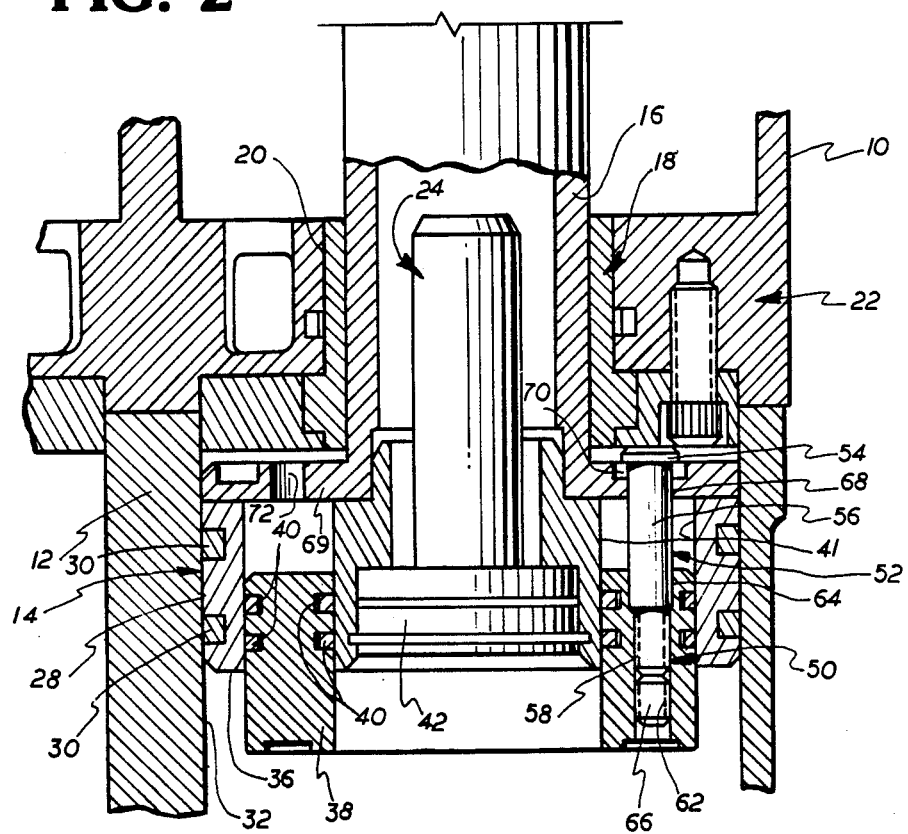
FIG. 2 is an enlarged cross-sectional view of a portion of the parison formation station illustrated in FIG. 1 with the tandem piston shown in the full up stroke position.

Each parison formation station has an upper cylinder 10 which is secured coaxially on top of a lower cylinder 12. Displaceable within this lower cylinder 12 is a piston 14 and integral rod 16 with the rod 16 passing through a suitable sealed opening 20 in the base 22 of the upper cylinder 10 (The base 22 includes a retainer plate 23 which retains the bushing seal 18 in position). To this rod 16, is secured the plunger assembly (not shown) which will form with the blank mold (also not shown) a selectively configured parison. Telescopically located within the rod 16 is an air conduit 24 which is secured to the base 26 of the lower cylinder 12 for delivering cooling air to the plunger interior.

The outer diameter 28 of the piston has suitable seals (TETRAFLUOR TM piston ring sets) 30 for effectively sealing the inner surface 32 of the lower cylinder 12. An annular groove 34 is defined in the bottom surface 36 of the piston 14 for receiving an annular piston 38 which has suitable seals (TFE carbon graphite reinforced) 40 for defining an effective seal with the side walls 41 of the annular groove 34. A centrally located seal 42 seals the cooling tube 24 and is maintained in position by a clip 43.

When air under pressure is introduced into the bottom of lower cylinder 12 via opening 44, the annular piston 38 is forced fully into the plunger piston 14, thereby defining a tandem piston. The pressure which operates on the total area of the pistons 14, 38 rapidly displaces the tandem piston upwardly.

Secured within three equispaced suitably configured vertical bores 50 defined in the annular piston 38 is a stop pin means comprising a shoulder screw 52 which has a head portion 54, an elongated constant diameter neck portion 56 and a reduced diameter threaded portion 58 which is to be threadedly received by the threaded portion 62 of vertical bore 50. The bore 50 also has an upper enlarged portion 64 to receive a portion of the neck 56 to provide a surface against which the neck portion can be located. The shoulder screw 52 is secured in position by a set or locking screw 66. The elongated neck portion 56 extends through an opening 68 in the top 69 of the plunger piston which is recessed 70.

When the tandem piston approaches the base 22 of the upper cylinder 10, the head portion 54 of the three shoulder screws 52 simultaneously engage the retainer plate 23 and stop further upward displacement of the annular piston 38. The pressure applied to the plunger piston 14, either directly or through the annular piston 38, immediately is reduced since pressure applied to the annular piston 38 is no longer transferred to the plunger piston 14. This pressure reduction, which can be selected by choosing the surface areas of these pistons 14, 38, slows piston displacement during the last $\frac{1}{2}''$ of displacement.

When the plunger is to be retracted, air under pressure will be applied to the top of the piston 14. This pressurized air passes through a hole 72 in the top of the piston 14 to push the annular piston 38 downwardly relative to the piston 14 until the shoulder screw heads 54 seat in recesses 70 limiting further relative movement. Further retraction, accordingly, is under full pressure with the tandem piston being rapidly displaced. Hole 72 serves as an exhaust during upward displacement assuring that the annular piston 38 can be fully advanced into piston groove 34.

When the annular piston 38 strikes the bottom 26 of the cylinder 12, it will stop and the plunger piston will continue to move downwardly until it also strikes the bottom of the cylinder.

We claim:

1. A plunger operating mechanism for a section of an individual section glass container forming machine comprising an upper cylinder having a base secured to a lower cylinder, said lower cylinder including
   a cylindrical inner surface,
   a first piston axially slideably displaceable along said cylindrical inner surface,
   an axially extending rod integral with said first piston and projecting into said upper cylinder through an opening defined in the base of the upper cylinder for connection with a plunger assembly,
   said first piston including
      a bottom having an annular axially extending groove therein,
      an annular second piston located within said groove, a plurality of concentric axial hole means extending through said first and second pistons, a corresponding plurality of stop pin means, wherein each stop pin of said plurality of stop pins is secured within a respective one of said axial hole means in said second piston and project upwardly through said plurality of hole means in said first piston for engaging the base of said upper cylinder when said rod is a selected distance from a fully advanced position, each of said stop pin means having a top with an enlarged head portion so that said second piston cannot be removed from said first piston.

2. A plunger operating mechanism according to claim 1, wherein said stop pin means comprises a shoulder screw and further comprising a corresponding plurality of set screws for locking said stop pin means in said axial hole means of said second piston.

* * * * *